(12) United States Patent
Nakatani

(10) Patent No.: US 9,004,419 B2
(45) Date of Patent: Apr. 14, 2015

(54) SUPPORT DEVICE

(75) Inventor: Koichiro Nakatani, Tokyo (JP)

(73) Assignee: Velbon Kabushiki Kaisha, Tokyo (JP)

( * ) Notice: Subject to any disclaimer, the term of this patent is extended or adjusted under 35 U.S.C. 154(b) by 126 days.

(21) Appl. No.: 13/817,076

(22) PCT Filed: Mar. 5, 2012

(86) PCT No.: PCT/JP2012/055554
§ 371 (c)(1),
(2), (4) Date: Feb. 14, 2013

(87) PCT Pub. No.: WO2013/132574
PCT Pub. Date: Sep. 12, 2013

(65) Prior Publication Data
US 2013/0313384 A1    Nov. 28, 2013

(51) Int. Cl.
| | |
|---|---|
| *F16M 11/12* | (2006.01) |
| *G03B 17/56* | (2006.01) |
| *F16M 11/04* | (2006.01) |
| *F16M 11/10* | (2006.01) |
| *F16M 11/20* | (2006.01) |
| *F16M 11/32* | (2006.01) |

(52) U.S. Cl.
CPC ........... *F16M 11/126* (2013.01); *G03B 17/561* (2013.01); *F16M 11/041* (2013.01); *F16M 11/10* (2013.01); *F16M 11/2014* (2013.01); *F16M 11/32* (2013.01); *F16M 2200/022* (2013.01)

(58) Field of Classification Search
USPC .......... 248/177.1, 178.1, 179.1, 180.1, 183.1, 248/183.2, 186.2
See application file for complete search history.

(56) References Cited

U.S. PATENT DOCUMENTS

| | | | | | |
|---|---|---|---|---|---|
| 2,318,633 | A | * | 5/1943 | Ries ........................... | 248/183.2 |
| 3,592,429 | A | * | 7/1971 | Miller et al. ............... | 248/179.1 |
| 5,365,293 | A | * | 11/1994 | Nakatani ..................... | 396/428 |
| 5,409,212 | A | * | 4/1995 | Arnett .......................... | 473/404 |
| 6,116,554 | A | * | 9/2000 | Wei ............................. | 248/183.1 |
| 6,124,892 | A | | 9/2000 | Nakano | |

(Continued)

FOREIGN PATENT DOCUMENTS

| | | |
|---|---|---|
| EP | 1 939 586 A2 | 7/2008 |
| JP | 62-066091 U | 4/1987 |

(Continued)

OTHER PUBLICATIONS

Manfrotto Distribution; Available: http://www.manfrotto.com/levelling-base (accessed on Aug. 30, 2012), taken from online catalogue of Lino Manfrotto + Co. Spa, a worldwide manufacturer of camera and lighting supports based in Cassola, Italy.

International Search Report mailed Jun. 5, 2012, which issued in during the prosecution of International Patent Application No. PCT/JP2012/055554.

(Continued)

*Primary Examiner* — Alfred J Wujciak
(74) *Attorney, Agent, or Firm* — Troutman Sanders LLP

(57) ABSTRACT

A support device for a tripod includes a base body. On the base body, a pan turning body is provided turnably in the horizontal direction. On the pan turning body, a tilt turning body is provided turnably in the up-down direction. The support device also includes a pan fixing operation body fixing the pan turning body with respect to the base body, and a tilt fixing operation body fixing the tilt turning body with respect to the pan turning body. The support device further includes a tilt turning operation body turning the tilt turning body with respect to the pan turning body.

4 Claims, 7 Drawing Sheets

(56) References Cited

U.S. PATENT DOCUMENTS

| | | | |
|---|---|---|---|
| 6,209,834 B1 | 4/2001 | Stonehouse | |
| 7,828,256 B2* | 11/2010 | Speggiorin | 248/187.1 |
| 8,418,973 B2* | 4/2013 | Liu et al. | 248/183.2 |
| 8,628,258 B2* | 1/2014 | Vogt | 396/428 |
| 2011/0006170 A1 | 1/2011 | Liu et al. | |

FOREIGN PATENT DOCUMENTS

| | | |
|---|---|---|
| JP | 09-304831 A | 11/1997 |
| JP | 2003244511 A | 8/2003 |

OTHER PUBLICATIONS

English translation of International Search Report, dated Jun. 5, 2012, which issued during the prosecution of International Patent Application No. PCT/JP2012/055554, which corresponds to the present application.

Japanese Office Action, dated Oct. 16, 2013, which issued during the prosecution of Japanese Patent Application No. 2012-528584, which corresponds to the present application.

Supplementary European Search Report dated Apr. 23, 2014, which issued during prosecution of European Patent Application No. 12769579.9, which corresponds to the present application.

* cited by examiner

Figure 1:
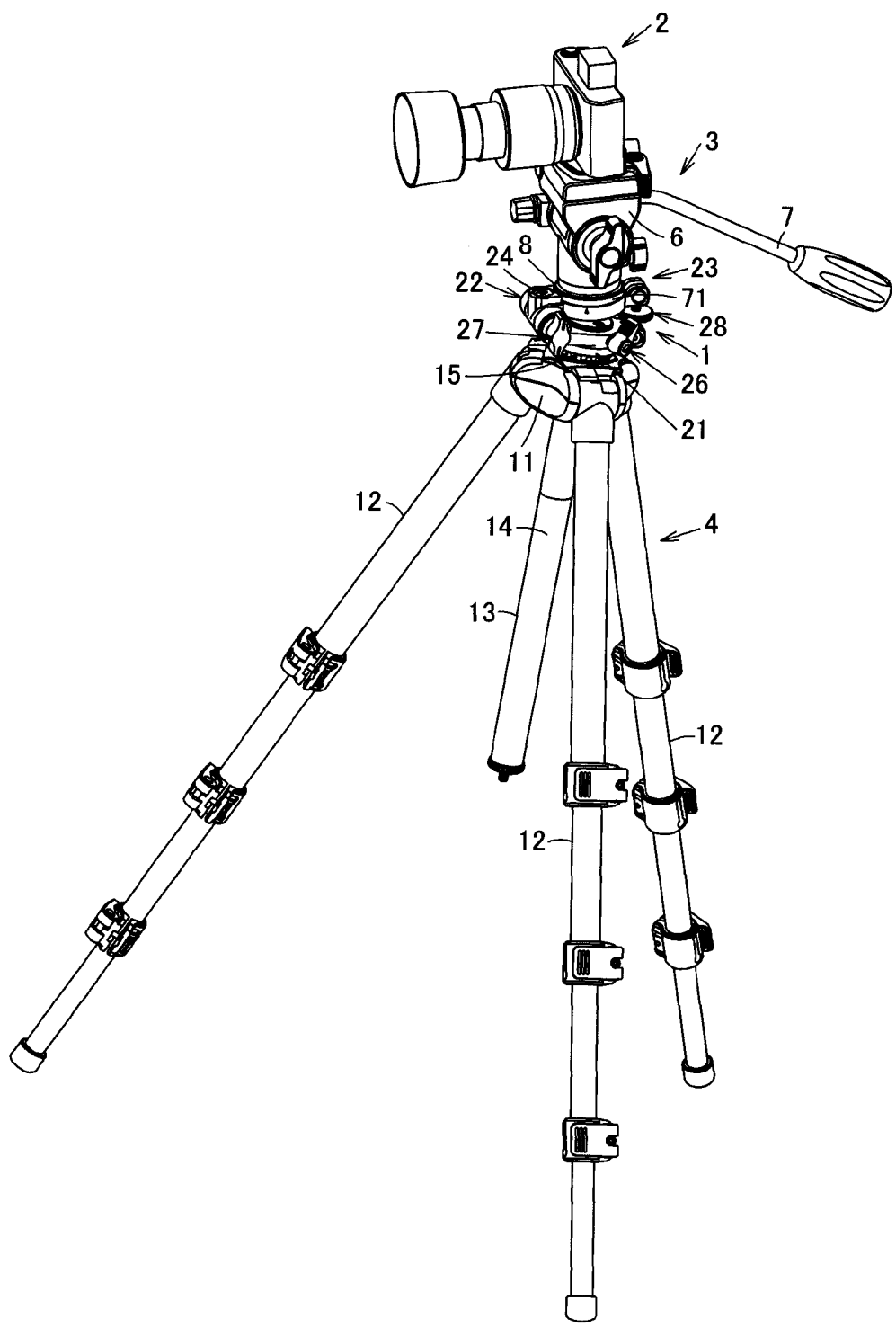
Figure 2:
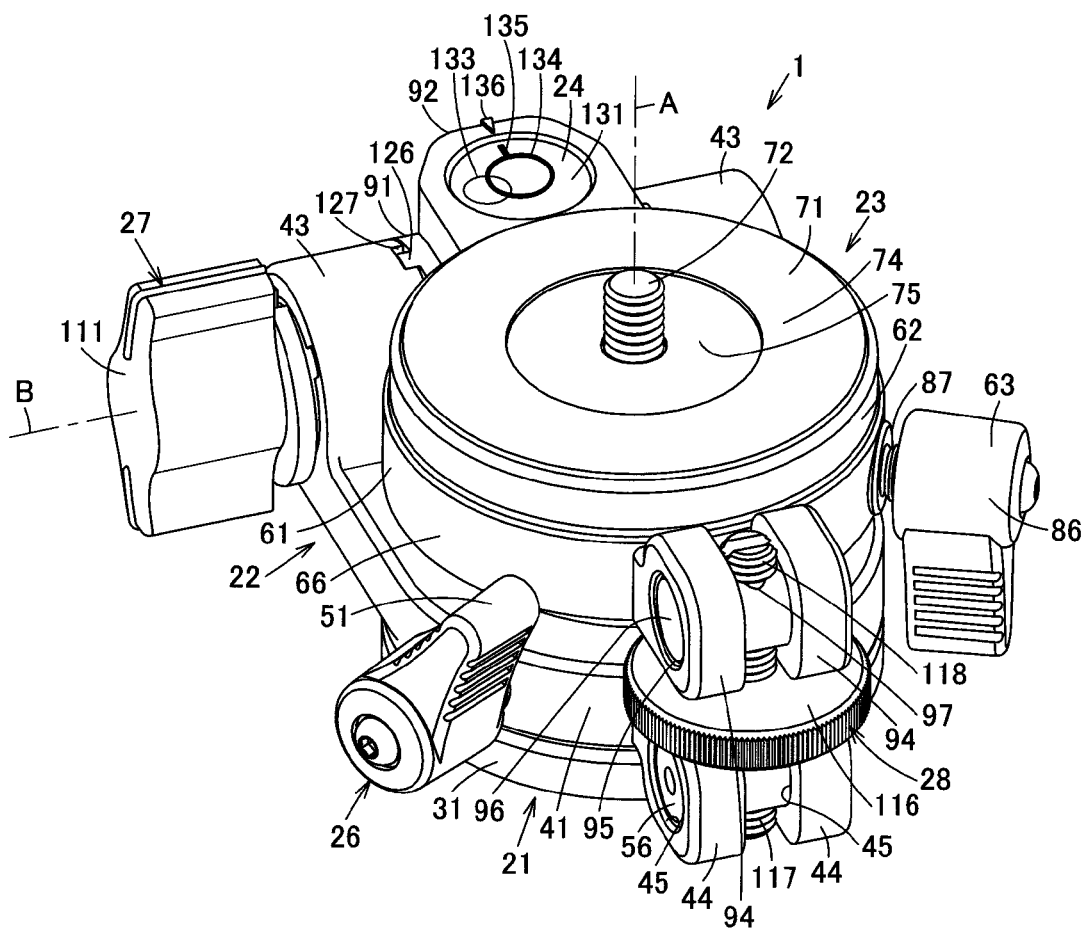
Figure 3:
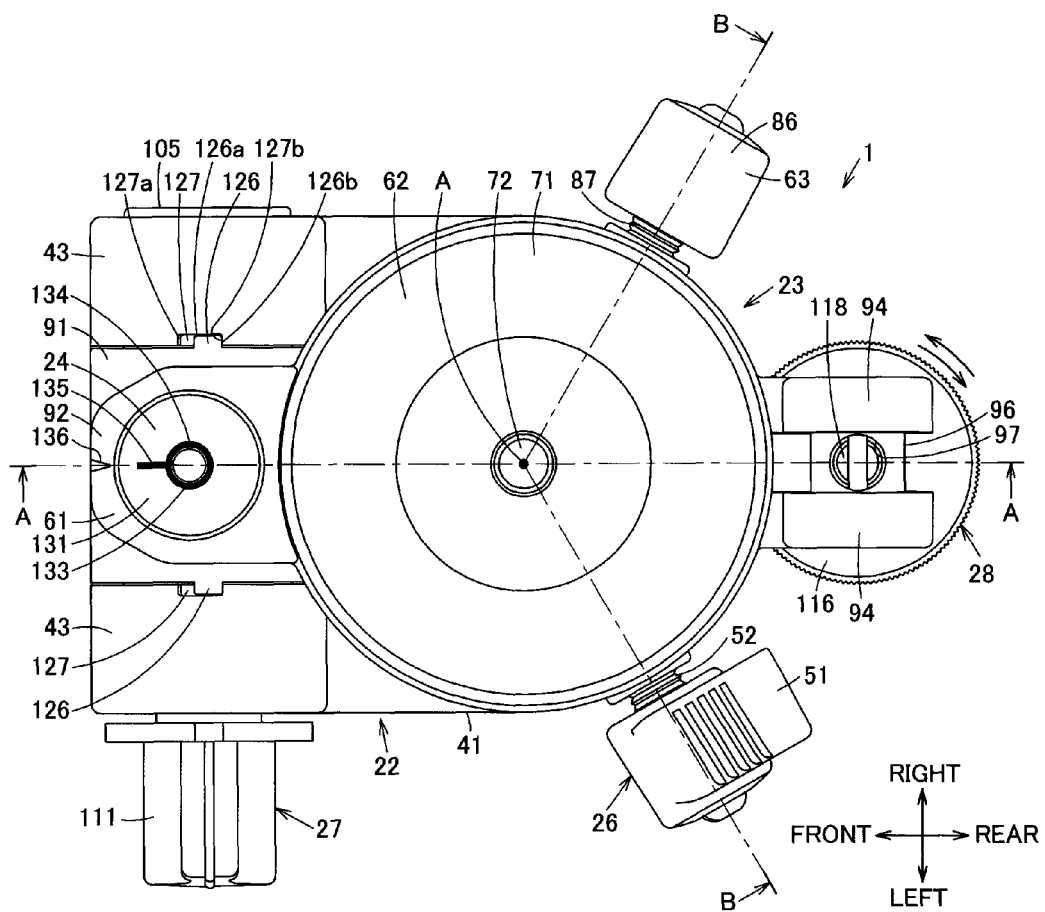
Figure 4:
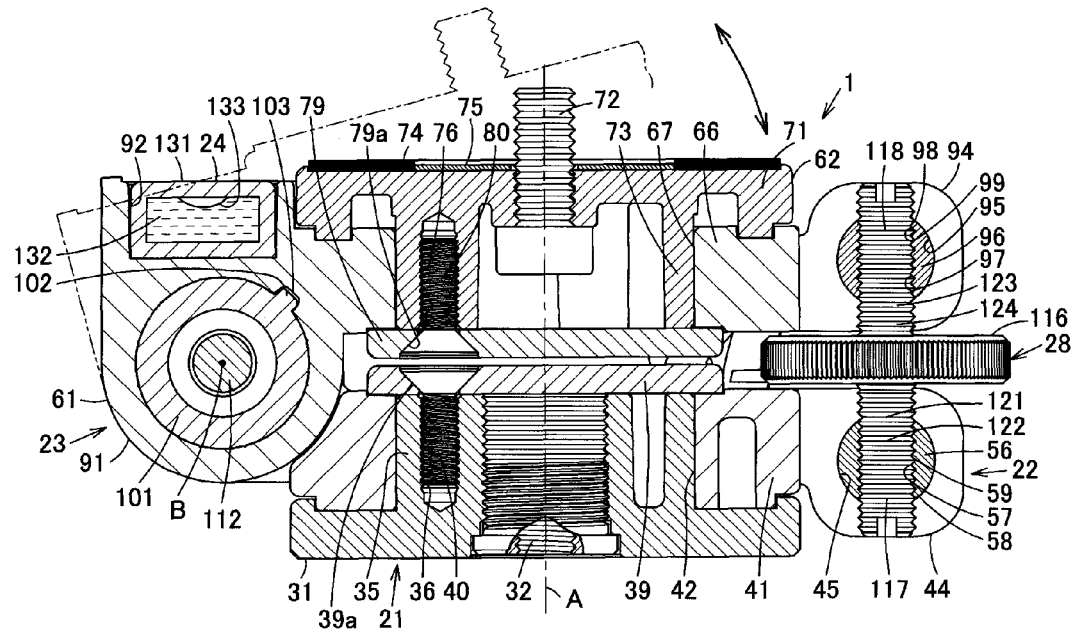
Figure 5:
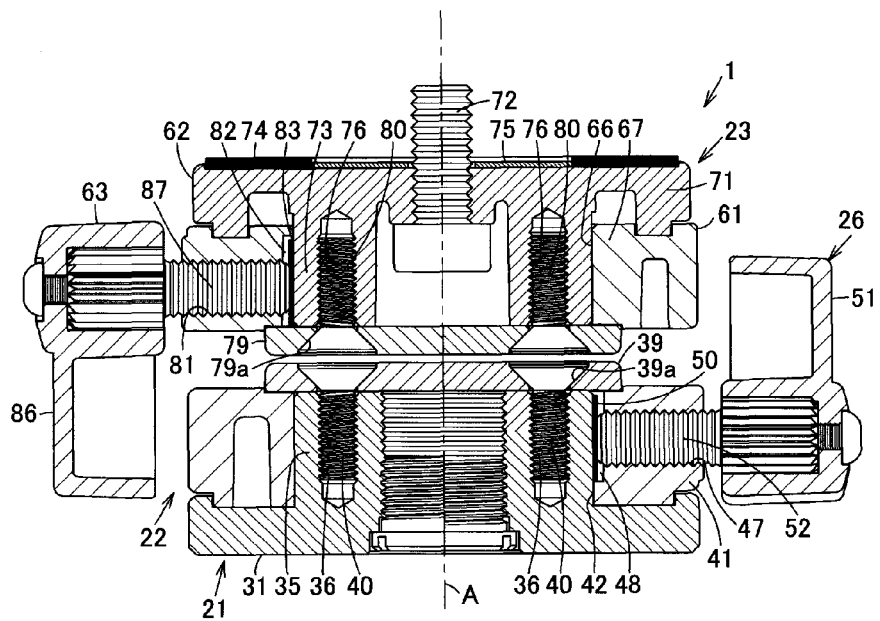
Figure 6:
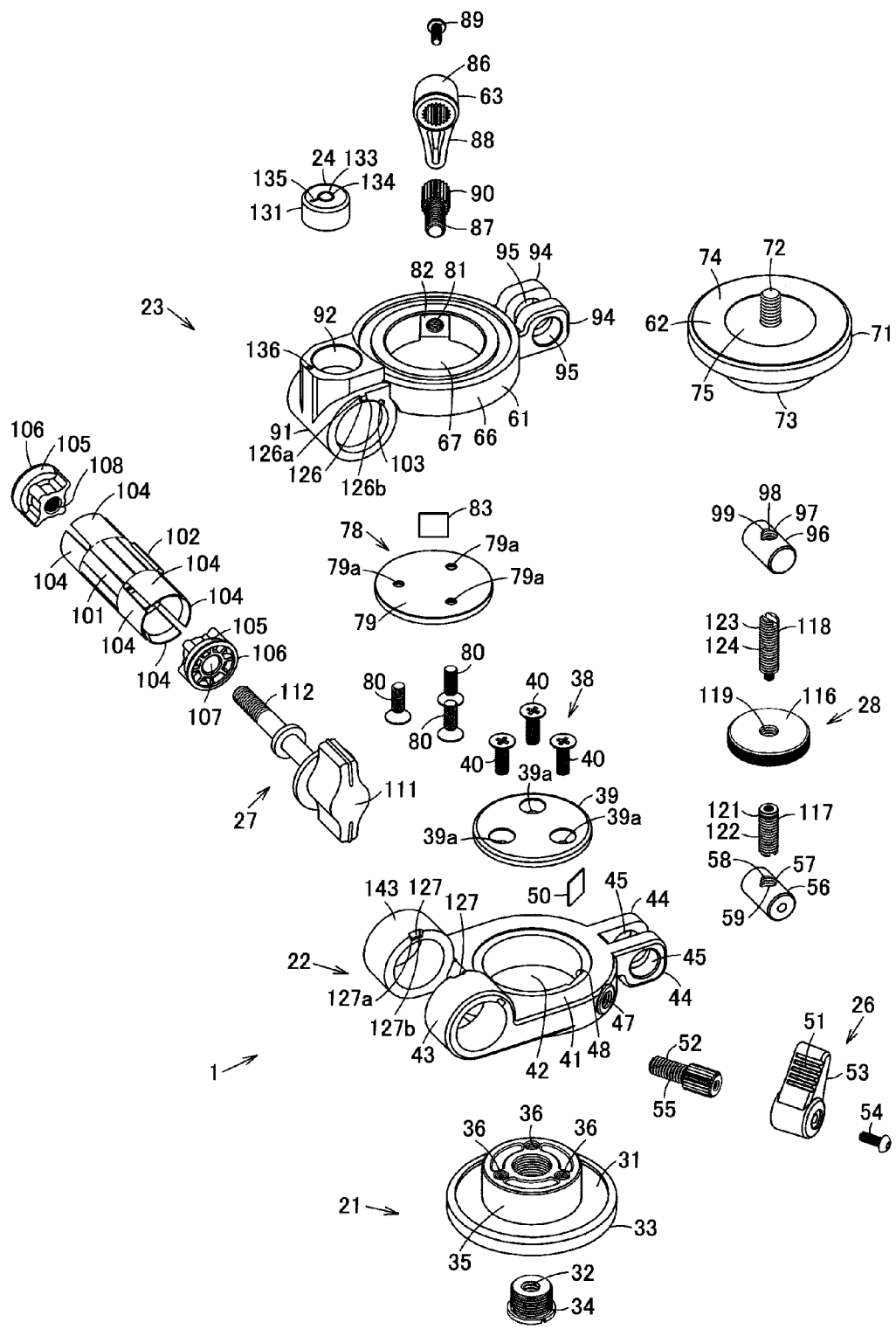
Figure 7:
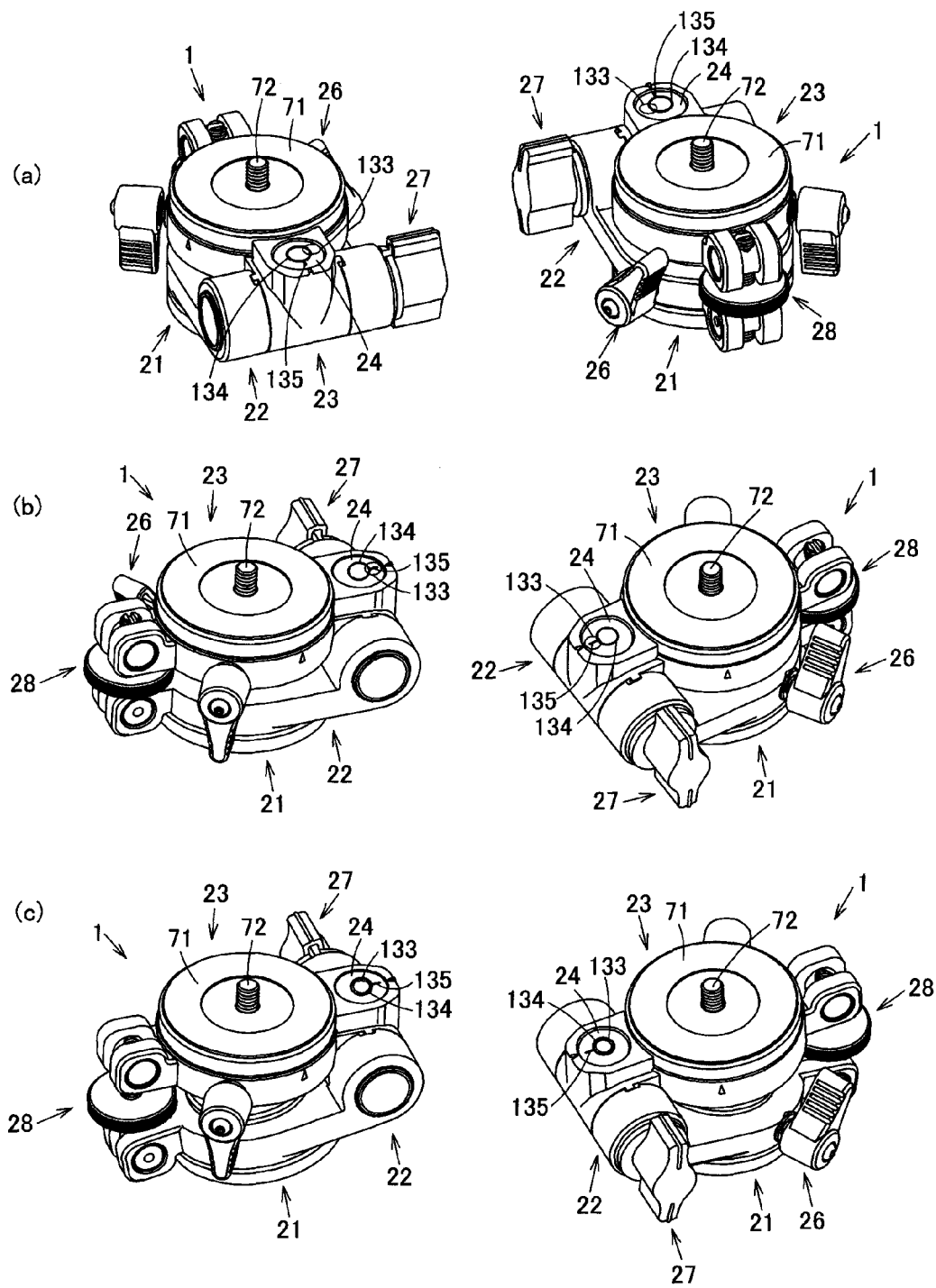
Figure 8:
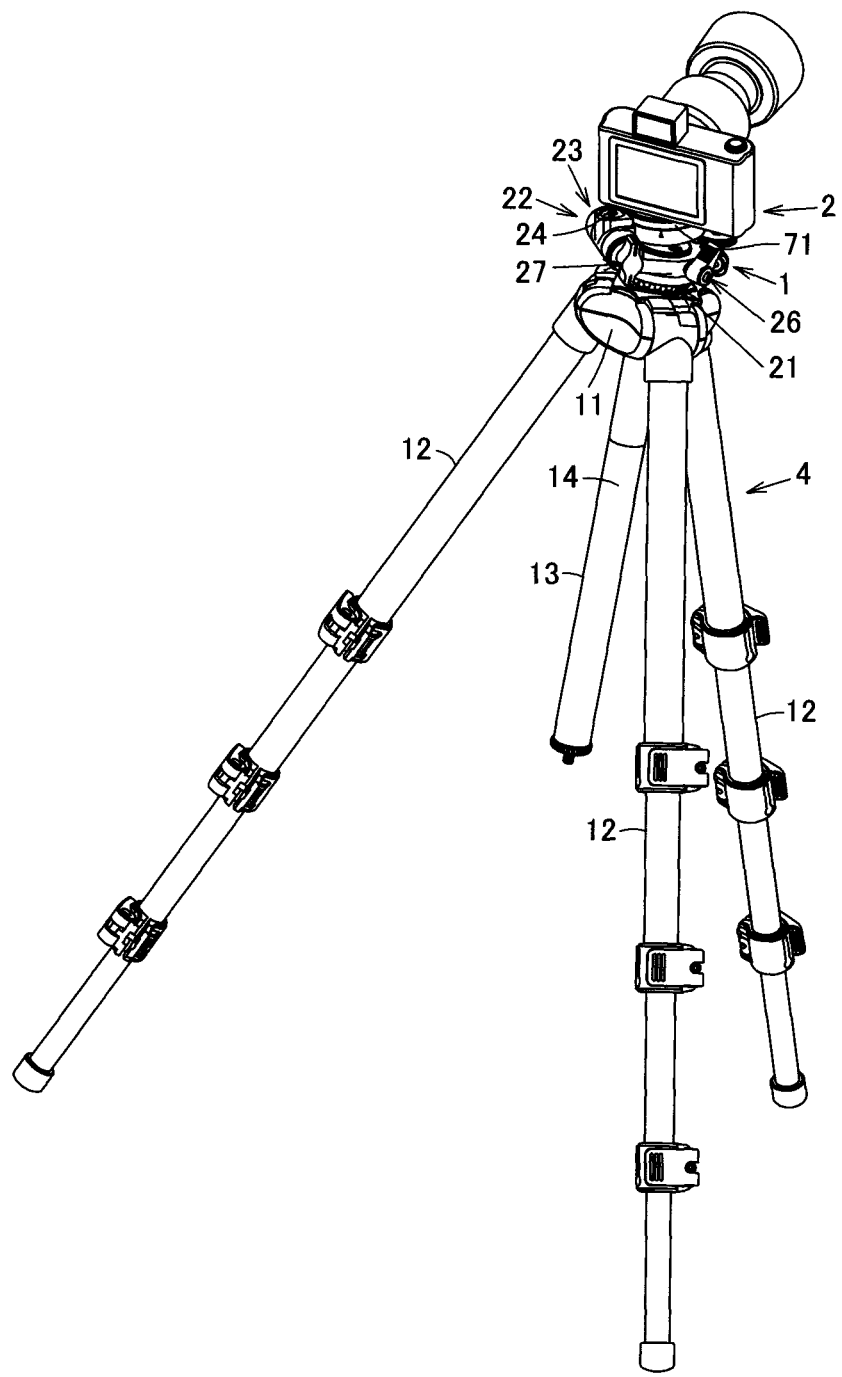

SUPPORT DEVICE
>
> ## CROSS REFERENCE TO PRIOR APPLICATION
>
> This application is a U.S. National Phase application under 35 U.S.C. §371 of International Application No. PCT/JP2012/055554, filed on Mar. 5, 2012. The disclosure of the International Application is incorporated herein by reference in its entirety.
>
> ## TECHNICAL FIELD
>
> The present invention relates to a support device by which an attaching object can be set in a horizontal state.
>
> ## BACKGROUND
>
> An example of conventional support devices is found in, for example, a publication available at Manfrotto Distribution KK, http://www.manfrotto.com/levelling-base.
>
> This conventional support device includes a disk-shaped base body to be attached to a tripod, a disk-shaped support body to which an attaching object such as a camera platform is attached, a level provided on the support body, and three operation bodies for turning the support body in the up-down direction with respect to the base body so that the attaching object is set in a horizontal state. The three operation bodies are provided rotatably at positions at 120-degree intervals in the circumferential direction between the base body and the support body.
>
> However, the operability of the above-described conventional support device is not satisfactory, and it may take time for an operator to set an attaching object in a horizontal state.
>
> The present invention has been made in view of this problem, and an object thereof is to provide a support device which has excellent operability and by which an attaching object can be easily set in a horizontal state.
>
> ## SUMMARY
>
> A support device according to an aspect of the present invention which supports an attaching object and by which the supported attaching object can be set in a horizontal state, includes a base body to be attached to a tripod, a pan turning body provided on the base body turnably in the horizontal direction, a tilt turning body which is provided on the pan turning body turnably in the up-down direction and to which an attaching object is attached, a level provided on the tilt turning body, a pan fixing operation body for fixing the pan turning body with respect to the base body in a releasable manner, a tilt fixing operation body for fixing the tilt turning body with respect to the pan turning body in a releasable manner, and a tilt turning operation body for turning the tilt turning body in the up-down direction with respect to the pan turning body.
>
> A support device according to another aspect of the present invention, in addition to the support device according to the aspect, includes the tilt turning operation body that is provided rotatably, and according to rotation in one direction of the tilt turning operation body, the tilt turning body turns upward with respect to the pan turning body, and according to rotation in the other direction of the tilt turning operation body, the tilt turning body turns downward with respect to the pan turning body.
>
> A support device according to yet another aspect of the present invention, in addition to the support device according to the another aspect, includes the pan turning body that has a lower screw hole portion, and the tilt turning body that has an upper screw hole portion, and the tilt turning operation body includes an operation main body portion, a lower screw shaft portion that projects downward from the operation main body portion and is screwed in the lower screw hole portion, and an upper screw shaft portion that projects upward from the operation main body portion and is screwed in the upper screw hole portion.
>
> A support device according to a further aspect of the present invention, in addition to the support device according to the aspect, includes the tilt turning body having an up-down turning member which is provided on the pan turning body turnably in the up-down direction and to which a level is fixed, a support member which is provided on the up-down turning member turnably in the horizontal direction and to which an attaching object is attached, and a fixing operation member for fixing the support member with respect to the up-down turning member in a releasable manner.
>
> A support device according to another further aspect of the present invention, in addition to the support device according to the aspect, includes the tilt fixing operation body and the pan fixing operation body that are arranged in a row in the front-rear direction in a plan view.
>
> A support device according to yet another further aspect of the present invention, in addition to the support device according to the aspect, includes the level that is a bubble level having an upper surface on which a circle line having a size corresponding to a bubble and a straight line in the front-rear direction are indicated.
>
> According to the present invention, an attaching object can be easily set in a horizontal state with excellent operability.
>
> ## BRIEF DESCRIPTION OF DRAWINGS
>
> FIG. 1 is a perspective view showing a usage state where a camera platform is attached to a support device according to an example of the present invention.
>
> FIG. 2 is a perspective view of the same support device.
>
> FIG. 3 is a plan view of the same support device.
>
> FIG. 4 is a sectional view taken along line A-A of the same support device.
>
> FIG. 5 is a sectional view taken along line B-B of the same support device.
>
> FIG. 6 is an exploded perspective view of the same support device.
>
> FIG. 7(a) to FIG. 7(c) are explanatory views for describing a method for using the same support device.
>
> FIG. 8 is a perspective view showing a usage state where a camera is attached to the same support device.
>
> ## DETAILED DESCRIPTION
>
> An example of the present invention is described with reference to the drawings.
>
> In FIG. 1 to FIG. 6, the reference numeral 1 denotes a support device, and this support device 1 is a horizontal setting device which supports, for example, a camera platform 3 being an attaching object on which a camera 2 is mounted, and by which the supported camera platform 3 can be set in a horizontal state (horizontal posture).
>
> FIG. 1 shows a usage state where the camera platform 3 is attached to the support device 1, and in this example, the support device 1 is attached between the camera platform 3 and a tripod 4.
>
> The camera platform 3 includes, as shown in FIG. 1, a camera platform main body 6 on which the camera 2 is removably mounted and which supports this mounted camera 2, and a rod-shaped operation body 7 provided to project to the camera platform main body 6. At the center portion of the bottom plate portion 8 of the camera platform main body 6, a screw hole portion (not illustrated) opened downward is formed.

The tripod 4 includes a body 11, a plurality of, for example, three rod-shaped leg bodies 12 provided on the body 11 turnably around a shaft in the horizontal direction and extensible and contractible in the longitudinal direction, and a rod-shaped elevator body 13 provided on the body 11 so as to rise and lower. The elevator body 13 has a pipe portion 14 that can rise and lower with respect to the body 11, and to the upper end portion of the pipe portion 14, a disk-shaped support plate portion 15 is fixed. At the center portion of the support plate portion 15, a screw shaft portion (not illustrated) is provided to project upward.

The support device 1 includes, as shown in FIG. 2 to FIG. 6, etc., a base body 21 that is removably attached to the upper end portion of the elevator body 13 of the tripod 4, a pan turning body 22 provided on the base body 21 turnably in the left-right direction that is the horizontal direction around a turning center axis A extending in the up-down direction, a tilt turning body 23 which is provided on the pan turning body 22 turnably in the up-down direction around a turning center axis B extending in the left-right direction that is the horizontal direction, and to which a camera platform 3 as an attaching object is removably attached, and a bubble level 24 that is a level fixed to the tilt turning body 23.

Further, the support device 1 includes a pan fixing operation body 26 such as a pan stopper rotatable for fixing the pan turning body 22 with respect to the base body 21 in a releasable manner, a tilt fixing operation body 27 such as a tilt stopper rotatable for fixing the tilt turning body 23 with respect to the pan turning body 22 in a releasable manner, and a tilt turning operation body 28 such as a tilt wheel rotatable for turning the tilt turning body 23 in the up-down direction around the horizontal turning center axis B with respect to the pan turning body 22 at the time of release of fixation of the tilt turning body 23 with respect to the pan turning body 22.

The tilt turning operation body 28 is provided rotatably between the tilt turning body 23 on the upper side and the pan turning body 22 on the lower side, and the tilt turning body 23 turns upward around the turning center axis B with respect to the pan turning body 22 according to rotation in one direction (clockwise direction in FIG. 3) of the tilt turning operation body 28, and the tilt turning body 23 turns downward around the turning center axis B with respect to the pan turning body 22 according to rotation in the other direction (counterclockwise direction in FIG. 3) of the tilt turning operation body 28.

The base body 21 includes a disk-shaped base plate portion 31 removably attached to the support plate portion 15 of the elevator body 13 of the tripod 4. At the center portion of the base plate portion 31, a screw hole portion 32 opened downward is formed. Specifically, for example, on a screw member 34 screwed with the base member 33, the screw hole portion 32 that can be screwed with a screw shaft portion of the elevator body 13 of the tripod 4 is formed (refer to FIG. 6).

On the upper surface of the base plate portion 31, a support portion 35 cylindrical in the up-down direction is provided integrally to project upward, and the outer peripheral surface of the support portion 35 is formed into a cylindrical surface shape. In the support portion 35, a plurality of, for example, three screw hole portions 36 opened upward are formed at positions at 120-degree intervals in the circumferential direction of the support portion 35.

By an attaching unit 38, the pan turning body 22 is attached to the base body 21 turnably. The attaching unit 38 includes, for example, a disk-shaped attaching plate 39 and a plurality of attaching screws 40. By inserting the attaching screws 40 into through holes 39a of the attaching plate 39 from above and screwing these in the screw hole portions 36 of the base body 21, the pan turning body 22 is sandwiched and held between the base plate portion 31 of the base body 21 and the attaching plate 39.

The pan turning body 22 includes an annular fitting portion 41 having a substantially ring shape that is fitted to the outer peripheral side of the support portion 35 of the base body 21 turnably in the horizontal direction around the turning center axis A. The annular fitting portion 41 includes a circular fitting hole portion 42 penetrating through the annular fitting portion in the up-down direction, and in this fitting hole portion 42, the support portion 35 of the base body 21 is fitted turnably.

On the front end portion that is one side of the annular fitting portion 41, a plurality of, for example, a pair of left and right tubular portions 43 cylindrical in the left-right direction are provided integrally to project forward. Each tubular portion 43 is formed into a cylindrical shape whose both end faces are opened.

On the rear end portion that is the other side of the annular fitting portion 41, a plurality of, for example, a pair of left and right plate-shaped portions 44 as vertical plate-shaped support portions spaced facing each other via a predetermined distance are provided integrally to project rearward. In each plate-shaped portion 44, a circular hole portion 45 penetrating through the plate-shaped portion in the left-right direction is formed.

A shaft-shaped portion 56 having a round shaft shape extending in the left-right direction is supported turnably by both plate-shaped portions 44. Specifically, in the hole portions 45 of both plate-shaped portions 44, both end portions in the axial direction of the shaft-shaped portion 56 are fitted turnably. At the center portion in the axial direction of the shaft-shaped portion 56, a lower screw hole portion 57 in a direction orthogonal to the axial direction is formed to penetrate through the shaft-shaped portion in the up-down direction so that both end faces of the lower screw hole portion are opened. The lower screw hole portion 57 is composed of a hole space 58 opened in both end faces in the axial direction of the shaft-shaped portion 56 and a thread groove 59 positioned to face this hole space 58.

Further, one screw hole portion 47 whose both end faces are opened is formed in the annular fitting portion 41, and one end portion of this screw hole portion 47 is opened in a recessed portion 48 formed on a part of the inner peripheral surface of the annular fitting portion 41, and in this recessed portion 48, a rectangular thin-plate-shaped plate member 50 is fitted. The other end portion of the screw hole portion 47 is opened diagonally toward the rear left side in a part of the outer peripheral surface of the annular fitting portion 41. The pan turning body 22 is composed of the annular fitting portion 41, the tubular portions 43, the plate-shaped portions 44, and the shaft-shaped portion 56, etc.

Here, the pan fixing operation body 26 includes an operation main body portion 51 to be manually operated to rotate by an operator who is a user, and a screw shaft portion 52 projecting in the horizontal direction from the operation main body portion 51. This screw shaft portion 52 is screwed in the screw hole portion 47 of the annular fitting portion 41 of the pan turning body 22. Specifically, the pan fixing operation body 26 is provided rotatably on the annular fitting portion 41 of the pan turning body 22. The pan fixing operation body 26 is formed by, for example, an operation member 53 and a screw member 55 fixedly attached to the operation member 53 by an attaching screw 54.

When an operator operates the operation main body portion 51 to rotate the pan fixing operation body 26 in one direction (tightening direction) with respect to the pan turning body 22, the tip end portion of the screw shaft portion 52 of the pan fixing operation body 26 comes into contact with the plate member 50, and this plate member 50 is pressure-joined and fixed to a part of the outer peripheral surface of the support portion 35 of the base body 21. Thus, by the rotation in one direction of the pan fixing operation body 26, the pan turning body 22 is fixed with respect to the base body 21 in a releasable manner.

When the operator operates the operation main body portion 51 to rotate the pan fixing operation body 26 in the other direction (untightening direction) with respect to the pan turning body 22, the tip end portion of the screw shaft portion 52 of the pan fixing operation body 26 separates from the plate member 50, and the pressure-joining and fixation of the plate member 50 with respect to the support portion 35 is released. Thus, by the rotation in the other direction of the pan fixing operation body 26, fixation of the pan turning body 22 with respect to the base body 21 is released. The rotation angle of the pan fixing operation body 26 when the operator rotationally operates the pan fixing operation body 26 is preferably, for example, 180 degrees or less, and for example, substantially 90 degrees.

The tilt turning body 23 includes an up-down turning member 61 which is provided on the pan turning body 22 turnably in the up-down direction around the turning center axis B in the horizontal direction and to which the bubble level 24 is fixed, a support member 62 which is provided on the up-down turning member 61 turnably in the horizontal direction around the turning center axis A in the up-down direction, to which the camera platform 3 is removably attached, and which supports the attached camera platform 3, and a fixing operation member 63 such as a panorama stopper rotatable for fixing the support member 62 with respect to the up-down turning member 61 in a releasable member.

The up-down turning member 61 includes an annular fitting portion 66 having a substantially ring shape, and a circular fitting hole portion 67 is formed to penetrate through the annular fitting portion 66 in the up-down direction. Into the fitting hole portion 67, a fitting projecting portion 73 of the support member 62 is fitted turnably.

The support member 62 includes a disk-shaped support plate portion 71, a screw shaft portion 72 that is provided to project upward to the center portion of the support plate portion 71 and can be screwed in the screw hole portion of the bottom plate portion 8 of the camera platform 3, and a cylindrical fitting projecting portion 73 extending in the up-down direction so as to project downward to the support plate portion 71, and this fitting projecting portion 73 is fitted turnably in the fitting hole portion 67 of the up-down turning member 61. The upper surface portion of the support plate portion 71 is composed of, for example, cork members 74 and 75.

The fitting projecting portion 73 has an outer peripheral surface formed into a cylindrical surface shape, and in this fitting projecting portion 73, a plurality of, for example, three screw hole portions 76 opened downward are formed at positions at 120-degree intervals in the circumferential direction.

By the attaching unit 78, the support member 62 is attached turnably to the up-down turning member 61. The attaching unit 78 is composed of, for example, a disk-shaped attaching plate 79 and a plurality of attaching screws 80. By inserting the attaching screws 80 into the through holes 79a of the attaching plate 79 from below and screwing the attaching screws in the screw hole portions 76 of the support member 62, the up-down turning member 61 is sandwiched and held between the support plate portion 71 of the support member 62 and the attaching plate 79.

In the annular fitting portion 66 of the up-down turning member 61, one screw hole portion 81 whose both end faces are opened is formed, and one end portion of this screw hole portion 81 is opened in a recessed portion 82 formed on a part of the inner peripheral surface of the annular fitting portion 66, and in this recessed portion 82, a rectangular and thin-plate-shaped plate member 83 is fitted. The other end portion of the screw hole portion 81 is opened diagonally toward the rear right side in a part of the outer peripheral surface of the annular fitting portion 66.

Here, the fixing operation member 63 is the same as the pan fixing operation body 26, and includes an operation main body portion 86 that is manually operated to rotate by an operator who is a user, and a screw shaft portion 87 projecting in the horizontal direction from the operation main body portion 86. This screw shaft portion 87 is screwed in the screw hole portion 81 of the annular fitting portion 66 of the up-down turning member 61. Specifically, the fixing operation member 63 is provided rotatably on the annular fitting portion 66 of the up-down turning member 61. The fixing operation member 63 is composed of, for example, an operation member 88 and a screw member 90 fixedly attached to the operation member 88 by an attaching screw 89.

When an operator operates the operation main body portion 86 to rotate the fixing operation member 63 in one direction (tightening direction) with respect to the up-down turning member 61, the tip end portion of the screw shaft portion 87 of the fixing operation member 63 comes into contact with the plate member 83, and this plate member 83 is pressure-joined and fixed to a part of the outer peripheral surface of the fitting projecting portion 73 of the support member 62. Thus, by the rotation in one direction of the fixing operation member 63, the support member 62 is fixed with respect to the up-down turning member 61 in a releasable manner.

When an operator operates the operation main body portion 86 to rotate the fixing operation member 63 in the other direction (untightening direction) with respect to the up-down turning member 61, the tip end portion of the screw shaft portion 87 of the fixing operation member 63 separates from the plate member 83, and the pressure-joining and fixation of the plate member 83 with respect to the fitting projecting portion 73 are released. Thus, by the rotation in the other direction of the fixing operation member 63, the fixation of the support member 62 with respect to the up-down turning member is released. The rotation angle of the fixing operation member 63 when an operator rotationally operates the fixing operation member 63 is preferably, for example, 180 degrees or less, and, for example, substantially 90 degrees.

Further, on the front end portion that is one side of the annular fitting portion 66 of the up-down turning member 61, one tubular portion 91 having a cylindrical shape in the left-right direction whose both end faces are opened is provided integrally to project forward. On the tubular portion 91, a level housing recess portion 92 is provided integrally to project upward, and in the level housing recess portion 92, the bubble level 24 is housed.

On the rear end portion that is the other side of the annular fitting portion 66, a plurality of, for example, a pair of left and right plate-shaped portions 94 as vertical plate-shaped support portions spaced facing each other via a predetermined distance are provided integrally to project rearward. In each plate-shaped portion 94, a circular hole portion 95 penetrating through the plate-shaped portion in the left-right direction is formed.

By both plate-shaped portions 94, a shaft-shaped portion 96 having a round shaft shape extending in the left-right direction is supported turnably. Specifically, both end portions in the axial direction of the shaft-shaped portion 96 are fitted turnably in the hole portions 95 of both plate-shaped portions 94. At the center portion in the axial direction of the shaft-shaped portion 96, an upper screw hole portion 97 extending in a direction orthogonal to the axial direction of the shaft-shaped portion is formed to penetrate in the up-down direction so that both end faces of the upper screw hole portion are opened. The upper screw hole portion 97 is composed of a hole space 98 opened in both end faces in the axial direction of the shaft-shaped portion 96 and a thread groove 99 positioned to face the hole space 98.

The up-down turning member 61 includes a tubular support shaft portion 101 fitted and fixed to the inner peripheral side of the tubular portion 91 by press-fitting, and both end sides in the axial direction of the support shaft portion 101 are fitted turnably to the inner peripheral sides of both tubular portions 43 of the pan turning body 22. Specifically, the support shaft portion 101 of the up-down turning member 61 has a cylindrical shape which is longitudinal in the left-right direction so that the turning center axis B passes through the central axis of the support shaft portion and has both end faces being opened, and is supported turnably by both tubular portions 43 of the pan turning body 22. The support shaft portion 101 has a convex portion 102 longitudinal in the axial direction on the outer peripheral side, and this convex portion 102 is fitted in a recess portion 103 on the inner peripheral side of the tubular portion 91.

Each of both end sides in the axial direction of the support shaft portion 101 is composed of a plurality of, for example, four deformable plates 104 that are deformable portions elastically deformable and have arc-surface shapes divided in the circumferential direction.

On the inner peripheral sides of both end sides in the axial direction of the support shaft portion 101, closed portions 106 on which truncated conical surfaces 105 that come into sliding contact with the inner surfaces of the deformable plates 104 are formed are fitted slidably in the axial direction of the support shaft portion 101, and by the closed portions 106, openings of both end faces of the support shaft portion 101 are closed. In one (for example, left side) closed portion 106 of the two left and right closed portions 106, a shaft insertion hole portion 107 is formed, and in the other (for example, right side) closed portion, a screw hole portion 108 is formed.

Here, a tilt fixing operation body 27 includes an operation main body portion 111 that is manually operated to rotate by an operator who is a user, and a screw shaft portion 112 that projects in the horizontal direction from the operation main body portion 111 so that the turning center axis B passes through the central axis thereof. This screw shaft portion 112 is inserted through the shaft insertion hole portion 107 of one closed portion 106 and screwed in the screw hole portion 108 of the other closed portion 106. Specifically, the tilt fixing operation body 27 is provided on the closed portion 106 that is the operation body support portion of the up-down turning member 61 of the tilt turning body 23 rotatably around the turning center axis B. The up-down turning member 61 is composed of the annular fitting portion 66, the tubular portion 91, the level housing recess portion 92, the plate-shaped portions 94, the shaft-shaped portion 96, the support shaft portion 101, and the closed portions 106, etc.

Then, when an operator operates the operation main body portion 111 to rotate the tilt fixing operation body 27 in one direction (tightening direction) with respect to the up-down turning member 61 of the tilt turning body 23, both closed portions 106 slightly slide in directions approaching each other with respect to the support shaft portion 101, and by these sliding movements, the deformable plates 104 on both end sides in the axial direction of the support shaft portion 101 are pressed by the truncated conical surfaces 105 and elastically deformed radially outward of the support shaft portion 101, and as a result, these deformable plates 104 are pressure-joined and fixed to apart of the inner peripheral surfaces of the tubular portions 43 of the pan turning body 22. Thus, by the rotation in one direction of the tilt fixing operation body 27, the tilt turning body 23 is fixed with respect to the pan turning body 22 in a releasable manner.

When the operator operates the operation main body portion 111 to rotate the tilt fixing operation body 27 in the other direction (untightening direction) with respect to the up-down turning member 61 of the tilt turning body 23, both closed portions 106 slightly slide in directions of separating from each other with respect to the support shaft portion 101, and by these sliding movements, the deformable plates 104 on both end sides in the axial direction of the support shaft portion 101 are returned to the original states based on their elastic restoring forces, and as a result, the pressure-joining and fixation of these deformable plates 104 with respect to the tubular portions 43 are released. Thus, by the rotation in the other direction of the tilt fixing operation body 27, the fixation of the tilt turning body 23 with respect to the pan turning body 22 is released.

At the time of this release of fixation of the tilt turning body 23 with respect to the pan turning body 22, by operating and rotating the tilt turning operation body 28 with respect to the pan turning body 22 on the lower side and the tilt turning body 23 on the upper side, the operator can turn the tilt turning body 23 in the up-down direction around the turning center axis B with respect to the pan turning body 22.

Here, the tilt turning operation body 28 is composed of, for example, only one screwing operation member that is screwed in both screw hole portions 57 and 97 in a operating rotatable manner.

The tilt turning operation body 28 includes a disk-shaped operation main body portion 116 that is manually operated to rotate by an operator who is a user, a lower screw shaft portion 117 longitudinal in the up-down direction that projects downward from the center portion lower surface of the operation main body portion 116 and is screwed in the lower screw hole portion 57 of the shaft-shaped portion 56 of the pan turning body 22, and an upper screw shaft portion 118 longitudinal in the up-down direction that projects upward from the center portion upper surface of the operation main body portion 116 and is screwed in the upper screw hole portion 97 of the shaft-shaped portion 96 of the up-down turning member 61 of the tilt turning body 23.

The operation main body portion 116 has a screw hole portion 119 penetrating through the upper and lower surfaces at the center portion, and into this screw hole portion 119, the upper end portion of the lower screw shaft portion 117 and the lower end portion of the upper screw shaft portion 118 are screwed and fixed. Specifically, the upper end portion of the lower screw shaft portion 117 and the lower end portion of the upper screw shaft portion 118 are joined, and this joined portion is fixed with respect to the operation main body portion 116.

The lower screw shaft portion 117 is composed of a shaft portion 121 longitudinal in the up-down direction and a thread groove 122 formed from one end to the other end of the shaft portion 121 on the outer peripheral surface of the shaft portion 121. Similarly, the upper screw shaft portion 118 is composed of a shaft portion 123 longitudinal in the up-down direction and a thread groove 124 formed from one end to the other end of the shaft portion 123 on the outer peripheral surface of the shaft portion 123.

Then, the direction of the thread groove 122 of the lower screw shaft portion 117 and the direction of the thread groove 124 of the upper screw shaft portion 118 are opposite to each other, and one of the both thread grooves 122 and 124 is configured as a right-hand thread, and the other is configured as a left-hand thread.

Therefore, according to rotation in one direction of the tilt turning operation body 28, both shaft-shaped portions 56 and 96 move apart from each other and the tilt turning body 23 turns upward, and according to rotation in the other direction of the tilt turning operation body 28, both shaft-shaped portions 56 and 96 move closer to each other and the tilt turning body 23 turns downward. At the time of this separating/approaching movement, the lower shaft-shaped portion 56 turns with respect to the plate-shaped portion 44 of the pan turning body 22, and the upper shaft-shaped portion 96 turns with respect to the plate-shaped portion 94 of the tilt turning body 23.

When the tilt turning operation body 28 rotates, convexed portions 126 that are a pair of left and right engagement portions of the tilt turning body 23 move inside recessed portions 127 that are a pair of left and right engagement receiving portions of the pan turning body 22.

Each recessed portion 127 has one side engagement receiving surface 127a that is an upper limit restricting portion for restricting upward turning of the tilt turning operation body 28 by contact and engagement with the one side engagement surface (front surface) 126a of the convexed portion 126, and the other side engagement receiving surface 127b that is a lower limit restricting portion for restricting downward turning of the tilt turning operation body 28 by contact and engagement with the other side engagement surface (rear surface) 126b of the convexed portion 126.

Thus, the permissible turning angle range of the tilt turning body 23 when it turns in the up-down direction with respect to the pan turning body 22 is set to, for example, a range of 15 degrees or less.

The bubble level 24 includes a transparent glass-made airtight container 131 fitted and fixed into the level housing recess portion 92 of the up-down turning member 61 of the tilt turning body 23. A liquid 132 such as alcohol and one bubble 133 are sealed within the airtight container 131. On the upper surface of the airtight container 131, a circle line 134 having a size corresponding to the one bubble 133 and a straight line 135 extending straight forward from the circle line 134 in the front-rear direction are indicated.

The circle line 134 is a circling curve slightly larger than the bubble 133. The length of the straight line 135 is substantially the same as the diameter of the circle line 134. On the upper surface front end portion of the level housing recess portion 92, a projection 136 that is a reference indicator triangular in a plan view is provided, and this projection 136 is positioned ahead of the straight line of the bubble level 24.

As shown in FIG. 3, etc., the tilt fixing operation body 27 and the pan fixing operation body 26 are arranged in a row in the front-rear direction in a plan view. The pan fixing operation body 26, the tilt fixing operation body 28, and the fixing operation member 63 are positioned at 60-degree intervals in the circumferential direction of the disk-shaped support plate portion (attaching object support portion) 71 in a plan view.

Specifically, the pan fixing operation body 26 is positioned diagonally toward the rear left side of the support plate portion 71, the fixing operation body 63 is positioned diagonally toward the rear right side of the support plate portion 71, the tilt turning operation body 28 is positioned at the rear of the support plate portion 71, and the bubble level 24 is positioned ahead of the support plate portion 71 in a plan view.

Next, operation and effect, etc., of the support device 1 are described with reference to the drawings.

For example, when the ground, etc., on which the tripod 4 is placed is not flat but uneven, the camera platform 3 on which the camera 2 is mounted tilts with respect to the horizontal direction. In this state, proper photographing cannot be performed, so that the camera platform 3 must be set in a horizontal state.

FIG. 7(a) shows a state of the support device 1 before horizontal setting, and when horizontal setting is performed from this state, an operator first rotates the pan fixing operation body 26 in the untightening direction to release the fixation of the pan turning body 22 with respect to the base body 21.

Next, as shown in FIG. 7(b), the operator turns the pan turning body 22 with respect to the base body 21 to align the bubble 133 of the bubble level 24 with the straight line 135 that is a reference line, and then rotates the pan fixing operation body 26 in the tightening direction to fix the pan turning body 22 with respect to the base body 21.

Then, the operator rotates the tilt fixing operation body 27 in the untightening direction to release the fixation of the tilt turning body 23 with respect to the pan turning body 22, and then, as shown in FIG. 7(c), turns the tilt turning body 23 with respect to the pan turning body 22 by rotationally operating the tilt turning operation body 28 so that the bubble 133 of the bubble level 24 aligns with the circle line 134.

Specifically, by rotating the tilt turning operation body 28 in one direction with respect to the pan turning body 22 on the lower side and the tilt turning body 23 on the upper side, the tilt turning body 23 is turned upward with respect to the pan turning body 22 so that the bubble 133 is set in the circle line 134.

Thereafter, the operator rotates the tilt fixing operation body 27 in the tightening direction to fix the tilt turning body 23 with respect to the pan turning body 22.

Thus, the support plate portion 71 that is the attaching object support portion of the support device 1 is set along the horizontal surface, and the camera platform 3 supported by the support plate portion 71 is set in a desired horizontal state.

This support device 1 includes the pan fixing operation body 26, the tilt fixing operation body 27, and the tilt turning operation body 28, etc., so that the operability when setting the camera platform 3 as an attaching object in a horizontal state is excellent, and the camera platform 3 can be easily set in a horizontal state.

The tilt turning operation body 28 includes the operation main body portion 116, the lower screw shaft portion 117 that projects downward from the operation main body portion 116 and is screwed in the lower screw hole portion 57, and the upper screw shaft portion 118 that projects upward from the operation main body portion 116 and is screwed in the upper screw hole portion 97, so that although the configuration is simple, the tilt turning body 23 can be properly turned by an operation of rotating the tilt turning operation body 28, and the camera platform 3 can be easily and properly set in a horizontal state.

Further, by two steps consisting of turning adjustment of the pan turning body 22 with respect to the base body 21 and turning adjustment of the tilt turning body 23 with respect to the pan turning body 22, the camera platform 3 can be set in a horizontal state, so that without taking a long time to perform horizontal setting, the operator can easily and properly set the camera platform 3 in a horizontal state.

In the above-described example, a case where the camera platform 3 is attached as an attaching object to the support plate portion 71 of the support member 62 of the tilt turning body 23, is described, however, the attaching object may be other than the camera platform 3, and for example, as shown in FIG. 8, even when the camera 2 is attached as an attaching object to the support plate portion 71, the same operation and effect are obtained such that the camera 2 can be easily set in a horizontal state.

The camera 2 as an attaching object is, for example, a digital camera or a video camera, etc. In the bottom plate portion of the camera 2, a screw hole portion that can be screwed with the screw shaft portion 72 of the support member 62 is formed. To attach the camera 2 to the support member 62, for example, a rubber plate with a predetermined thickness is interposed between the bottom plate portion of the camera 2 and the support plate portion 71 of the support member 62.

The attaching object may be any object such as a measuring instrument and an inspection device, etc., other than the camera platform and the camera.

Further, the level is not limited to the bubble level 24 formed by sealing a bubble within an airtight container, and the level may be, for example, a digital level, etc., using an LED lamp.

The configuration of the tilt turning body 23 is not limited to that including the up-down turning member 61, the support member 62 turnable with respect to the up-down turning member, and the fixing operation member 63 for fixing the support member 62, and for example, a configuration, etc., in which the upper surface portion of the up-down turning member serves as the attaching object support portion, and an attaching object is attached to this attaching object support portion is also possible.

Further, the configuration is not limited to the configuration in which the tilt turning operation body 28 is operated to rotate, and for example, a configuration, etc., in which the tilt turning operation body is operated to move in the up-down direction or operated to move in the horizontal direction is also possible.

The present invention is applicable to a support device that supports, for example, a camera platform, a camera, etc.

The invention claimed is:

1. A support device for a tripod which supports an attaching object and by which the supported attaching object can be set in a horizontal state, comprising:
    a base body;
    a pan turning body provided on the base body turnably in a vertical axis;
    a tilt turning body provided on the pan turning body turnably in the up-down direction and to which the attaching object is attached;
    a level provided on the tilt turning body for leveling the pan turning body with respect to the base body;
    a pan fixing operation body fixing the pan turning body with respect to the base body in a releasable manner;
    a tilt fixing operation body fixing the tilt turning body with respect to the pan turning body in a releasable manner; and
    a tilt turning operation body turning the tilt turning body in the up-down direction with respect to the pan turning body,
    wherein the tilt turning operation body is provided rotatably,
    wherein according to rotation in one direction of the tilt turning operation body, the tilt turning body turns upward with respect to the pan turning body,
    wherein according to rotation in the other direction of the tilt turning operation body, the tilt turning body turns downward with respect to the pan turning body,
    wherein the pan turning body has a lower screw hole portion,
    wherein the tilt turning body has an upper screw hole portion, and
    wherein the tilt turning operation body comprises:
        an operation main body portion,
        a lower screw shaft portion projecting downward from the operation main body portion and being screwed in the lower screw hole portion, and
        an upper screw shaft portion projecting upward from the operation main body portion and being screwed in the upper screw hole portion.

2. A support device for a tripod which supports an attaching object and by which the supported attaching object can be set in a horizontal state, comprising:
    a base body;
    a pan turning body provided on the base body turnably in a vertical axis;
    a tilt turning body provided on the pan turning body turnably in the up-down direction and to which an attaching object is attached;
    a level provided on the tilt turning body for leveling the pan turning body with respect to the base body;
    a pan fixing operation body fixing the pan turning body with respect to the base body in a releasable manner;
    a tilt fixing operation body fixing the tilt turning body with respect to the pan turning body in a releasable manner; and
    a tilt turning operation body turning the tilt turning body in the up-down direction with respect to the pan turning body,
    wherein the tilt turning body comprises:
        an up-down turning member provided on the pan turning body turnably in the up-down direction, and to which the level is fixed,
        a support member provided on the up-down turning member turnably in the vertical axis and to which the attaching object is attached, and
        a fixing operation member fixing the support member with respect to the up-down turning member in a releasable manner.

3. The support device according to claim 1, wherein the tilt fixing operation body and the pan fixing operation body are arranged in a row in the front-rear direction in a plan view.

4. The support device according to claim 1, wherein the level is a bubble level having an upper surface on which a circle line having a size corresponding to a bubble and a straight line in the front-rear direction are indicated.

* * * * *